June 19, 1951          J. GABRIEL          2,557,272

FISH SCALER

Filed Nov. 27, 1946

INVENTOR.
John Gabriel
BY Busser + Harding
ATTORNEYS

Patented June 19, 1951

2,557,272

UNITED STATES PATENT OFFICE 2,557,272

FISH SCALER

John Gabriel, Camden, N. J.

Application November 27, 1946, Serial No. 712,599

3 Claims. (Cl. 17—5)

This invention relates to power operated fish scalers arranged to be driven by means of a flexible shaft driven from any desired source of power.

One of the objects of my invention is the provision of a device of this character which can readily be disassembled for cleaning and again reassembled by means of two separable connections between the several members.

Another object of my invention is the provision of a blade supporting drum together with blades so shaped and secured to the drum that blades can readily be replaced by new blades when down.

Another object of my invention is the provision of an adjustable shield whereby the shield may be raised and again fixedly secured in position to provide the proper clearance between the shield or guard and blades for the proper operation of the scaler as the blades wear away.

Having now described, in a general way, the nature and purpose of this invention, I will proceed for illustrative purposes to a detailed description of a preferred embodiment thereof with reference to the accompanying drawings, in which:

Figure 1:
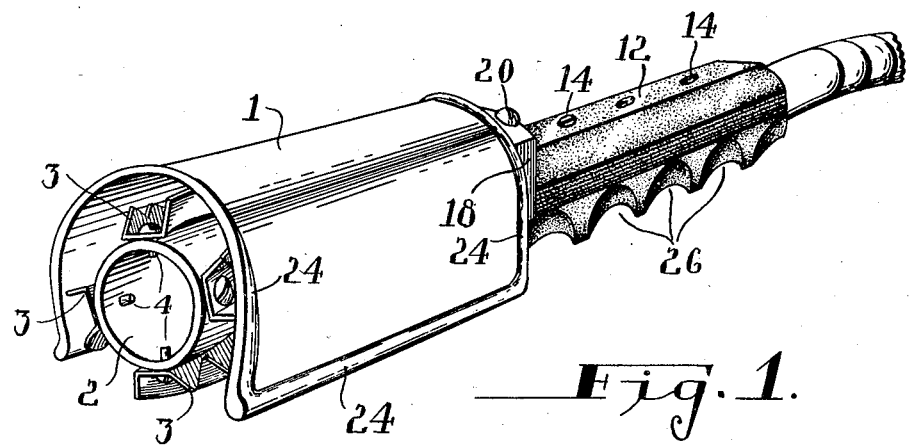
Fig. 1 is a perspective view of an assembled scaler connected to a flexible shaft.
Figure 2:
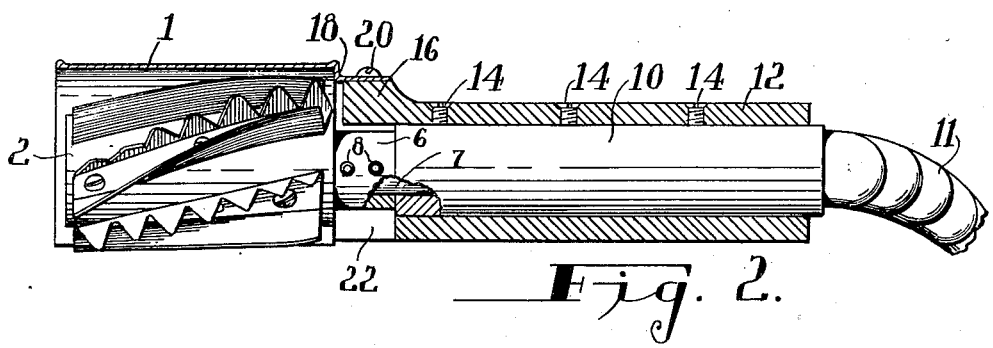
Fig. 2 is a longitudinal section through the shield, the handle and the head of the handle with portions broken away to show the connections between the end of the driving shaft and the tubular extension from the blade drum.
Figure 3:
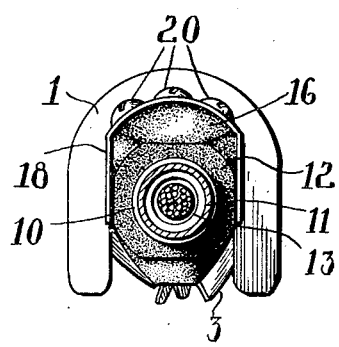
Fig. 3 is a rear end view of the device, the flexible shaft being shown in section.
Figure 4:
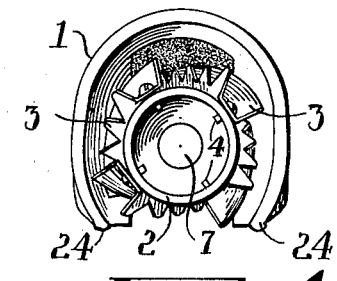
Fig. 4 is a front view.

Referring to the drawings, the reference character 1 designates the guard or shield adapted to engage the fish during the movement of the scaler over the fish as well as prevent the removed scales from being thrown radially by the blades and also acts as a guard for covering a rotatable drum 2 which is provided with spirally arranged scaling blades 3 of channel shape, one of the flanges being provided with teeth while the other merely acts as a scraper for removing the raised and loosened scales from the fish being cleaned. The blades are secured to the face of the drum by screws 4 passing through the webs of the blades.

The drum 2 is open at the front end while the rear wall is provided with a tubular extension 6 which is secured to the driving spindle 7 by means of blind set screws 8. The spindle 7 is rotatably mounted in the usual sleeve 10 at the end of a flexible covering 11 for a flexible shaft 13 which shaft is connected to the spindle 7. The driving unit comprising the spindle 7, sleeve 10, flexible shaft and covering, is well known and is sold as a complete unit for attachment to the connecting portion of a member to be driven. The sleeve 10 is mounted in a handle 12, which may be formed of plastic or other suitable material and is secured thereto by means of screws 14. The handle is provided with a head 16 to which an extension 18 from the rear wall of the guard is secured by screws 20. The rear wall of the shield together with the head close all space at the inner end of the shield when the scaler is in use, with the exception of an opening 22 in the bottom of the head 16 through which the screws 8 are accessible for disconnecting the drum from the spindle.

The sides of the head on the handle are parallel to each other while the upper face thereof is arcuate, the inner faces of the extension 18 of the shield are shaped to perfectly contact with the side faces and upper face of the head so that the shield is rigidly secured to the handle.

All of the edges of the shield 1 as well as the outer face of the junction between rear wall and the walls covering the scaler are reinforced by beads 24, the lower beads paralleling the axis of the scaler also provide rounded faces which engage the fish during scaling.

The handle 12 is provided with a plurality of finger grips 26 along lower edges at the sides and is also provided with a flat top so that the operator can obtain a firm grip thereon to resist the turning movement of the handle and shield due to the rotation of the spindle.

During the scaling of a fish, the operator holds the head of the fish in one hand and moves the scaler over the fish from the tail towards the head of the fish, the blades loosening and removing the scales from the fish, while the shield limits the pressure of the blades against the fish. The guard also prevents the scales from being thrown radially by the blades and as the blades are spirally arranged on the drum the scales will be fed outwardly through the open end of the shield.

When it is desired to clean the scaler, it is only necessary to invert the device and permit water to flow from a tap into the rear of the guard to wash out a small portion of scales which have adhered to the inner face of the guard and blades as the major portion of the scales are thrown out through the open end of the guard by the action of the blades. If it is desired to disassemble the device it is only necessary to loosen the screws 8 and 14, the drum 2, as well as the sleeve 10, are then free to be drawn out through the shield and handle respectively, thus exposing the inner face of the shield and providing a through opening through the handle, through which a brush can be inserted and the shield flushed by permitting the water to flow through the bore in the handle.

The exterior of the drum and blades secured to the periphery thereof as well as the spindle are also free for brushing and rinsing, and as the drum is open at both ends the interior thereof can also be cleansed.

After cleansing and drying the parts, it is only necessary to insert the sleeve into the handle and secure the sleeve to the handle and secure the tubular extension 6 to the end of the spindle to place the scaler in operative condition.

In scaling fish for the best results, it is desirable that the lower edges of the guard or shield should be positioned so that the sweep of the blades should be slightly beyond a plane across the fish engaging faces of the guard, and in order to compensate for wear of the blades applicant has provided means whereby the guard may be raised to compensate for the wear on the blades so that the blades may be worn down to a considerable degree before it is necessary to discard the blades while maintaining the efficiency of the device by adjusting the guard to compensate for the wear on the blades.

Figure 5:
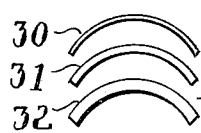
Fig. 5 is a face view of several shims.

This is accomplished by inserting a shim 30, 31 or 32 or the required number of shims such as shown in Fig. 5 between the head 16 on the handle and the extension from the rear wall 18 of the guard to compensate for the worn down portion of the blades.

One of the advantages of my invention results from the provision of a fish scaler formed of freely separable units, one of the units comprising a guard secured to a handle forming the support for the end of a flexible shaft unit, the other unit comprising a scaling device including a drum having a plurality of scaling blades secured to the periphery thereof, the drum being connected to a spindle of the flexible shaft unit arranged to be slipped into the handle and secured thereto, while the scaling device is slipped and connected to, through the guard of the other unit, the end of the spindle of the flexible shaft unit.

Another advantage results from the provision of separable units which are so arranged that when separated all surfaces of each unit can be cleaned by brushing and rinsing.

A still further advantage results from the provision of means whereby the guard may be adjusted on the handle and rigidly secured thereto after adjustment to compensate for the wearing down of the blades.

What I claim and desire to protect by Letters Patent is:

1. A fish scaler comprising a driving spindle and a drum secured thereto, a handle in which said driving spindle is turnable and a cylindrical guard secured to the handle and surrounding said drum; a plurality of channel shaped open top members carried by said drum, one side member of each channel having a smooth edge and the other side member having a toothed scaling edge, each channel extending lengthwise of the drum and curved from end to end in the form of a true spiral, said surrounding guard being closed at the end thereof adjacent the spindle and being open at its other end, whereby removed scales are continuously transported along the channel and continuously ejected through the open end of the guard.

2. The fish scaler defined in claim 1 in which opposite ends of each channel are on radii of the axis spaced apart by substantially 90°.

3. The fish scaler defined in claim 2 which comprises four channel members equally spaced apart and together having a spread of substantially 360° around the axis of the drum.

JOHN GABRIEL.

REFERENCES CITED

The following references are of record in the file of this patent:

UNITED STATES PATENTS

| Number | Name | Date |
|---|---|---|
| 1,324,581 | Boesch et al. | Dec. 9, 1919 |
| 1,642,802 | Barry | Sept. 20, 1927 |
| 1,758,675 | Reilly | May 30, 1930 |
| 1,775,693 | Price | Sept. 16, 1930 |
| 1,982,083 | Strand | Nov. 27, 1934 |
| 1,982,084 | Strand | Nov. 27, 1934 |
| 2,154,187 | Scoville | Apr. 11, 1939 |